United States Patent [19]

Tomioka

[11] Patent Number: 4,503,105
[45] Date of Patent: Mar. 5, 1985

[54] PLASTIC CORE FOR AN ELASTICALLY SHRINKABLE TUBULAR COVER

[75] Inventor: Shigeo Tomioka, Tokyo, Japan

[73] Assignee: Minnesota Mining and Manufacturing Company, St. Paul, Minn.

[21] Appl. No.: 572,505

[22] Filed: Jan. 20, 1984

[30] Foreign Application Priority Data

Feb. 4, 1983 [JP] Japan .............................. 58-15355[U]

[51] Int. Cl.³ .............................................. F16L 11/00
[52] U.S. Cl. ........................................ 428/36; 29/235; 138/122; 174/135; 174/84 R
[58] Field of Search ............................ 428/36; 29/235; 138/122; 174/135, 84 R

[56] References Cited

U.S. PATENT DOCUMENTS 3,515,798  6/1970  Sievert ................................. 174/135
4,338,970  8/1982  Krackeler et al. ..................... 29/235
4,389,440  6/1983  Keith ................................... 174/135

Primary Examiner—John E. Kittle
Assistant Examiner—James J. Seidleck
Attorney, Agent, or Firm—Donald M. Sell; James A. Smith; Terryl K. Qualey

[57] ABSTRACT

A hollow tubular core for supporting an elastic tubular cover member in a highly radially stretched condition comprises a cylindrical plastic tube having a plurality of circumferentially spaced, axially extending lugs on the inner wall of the tube and a continuous helical cut in the wall of the tube from the exterior surface thereof severing the tube into a continuous narrow strip with only the lugs connected axially along the length of the tube.

1 Claim, 6 Drawing Figures

PLASTIC CORE FOR AN ELASTICALLY SHRINKABLE TUBULAR COVER

TECHNICAL FIELD

This invention relates to a hollow tubular plastic core for an elastically shrinkable tubular cover to be applied as a covering around an electrical cable or the like.

BACKGROUND ART

A hollow tubular plastic core for an elastically shrinkable tubular cover must have sufficient strength to resist the shrinkage force of the cover member and retain its tubular shape, and it must be easily removed by breaking into a continuous strip with simple manual work. Known hollow plastic cores for elastically shrinkable tubular covers include one in which a continuous helical cut is made in the wall along the entire length of a tube, as disclosed in U.S. Pat. No. 3,515,798, and one in which a plastic strip is wound in a helix to make a tubular form with the edges of the strip abutted, and the abutted edges being ultrasonically spot welded.

It has been found to be impractical to make the tubular plastic core by making a continuous helical cut in a tube having a uniform wall thickness because of the problems of maintaining the cut at a given depth due to variations in the roundness and the wall thickness of the core and the movement of a cutter in cutting. A cut that is too deep does not provide sufficient strength to resist the shrinkage force of the tubular cover member or to prevent the tubular structure from deforming the core which might not permit a cable to be inserted. A cut that is too shallow does not permit the core to be manually broken into a strip with sufficient ease.

It is necessary in the process of forming a plastic strip into a tube by abutting its edges to be certain that the edges align properly, and the manufacturing process is, therefore, complex. Furthermore, due to its helical winding, the core can be broken into a strip only in one direction (an attempt to break it in the opposite direction will get the core tangled). The directional property of such a plastic core has to be taken into consideration in use, causing inconvenience in certain applications.

DISCLOSURE OF INVENTION

In accordance with the present invention, there is provided a hollow tubular plastic core having a plurality of lugs extending longitudinally on its inner wall. A continuous helical cut made in the wall from the exterior surface thereof along its entire length severs the tube into a continuous strip with only the lugs connected axially along the length of the tube. One end of the strip is broken free from the tube for a distance and extends back through the tube.

DETAILED DESCRIPTION

Figure 1:
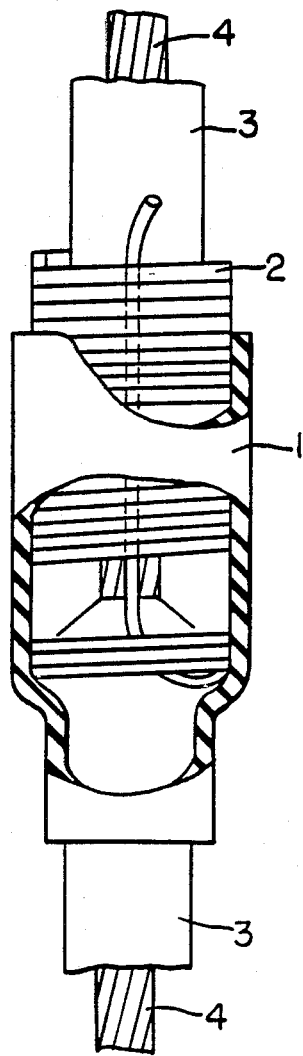
FIG. 1 is a partially sectioned side elevation view illustrating a device for covering a portion of a cable to be connected employing the hollow tubular plastic core of this invention, with the core partially removed.
Figure 2:
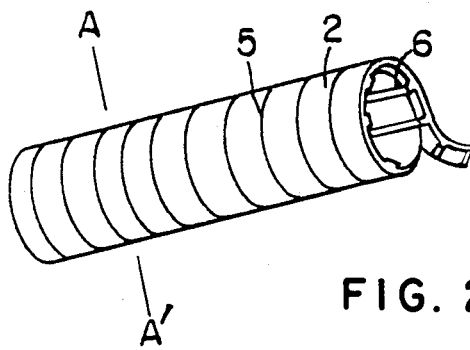
FIG. 2 is a perspective view of one embodiment of the hollow tubular plastic core of this invention.

FIG. 1 shows two cable ends, each comprising a stranded conductor 4 and an insulating covering 3. The insulation is cut away and the conductors 4 joined together end-to-end by suitable means not shown but which may typically consist of a compressed or indented metal sleeve or a close-fitting metal tube with set-screw retainers. The joint or splice may be covered with insulating mastic or tape, here omitted for clarity of illustration.

The cover assembly illustrated in FIG. 1 comprises an elastic tubular cover member 1 supported in a highly radially stretched condition on a hollow tubular plastic core 2 constructed in accordance with the present invention. The assembly is slipped over one of the wire ends prior to joining the two ends. After the splice is completed, the assembly is slid into position over the splice area and the plastic core 2 is removed to permit the elastic cover to contract and form a tight fit. FIG. 1 illustrates the assembly after the core has been partially removed.

Figure 3A:
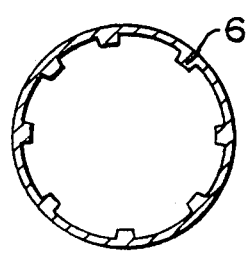
FIG. 3A is a cross-sectional view taken generally along line A—A' of FIG. 2.
Figure 3B:
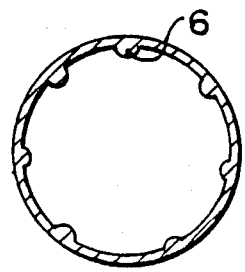
FIGS. 3B, 3C and 3D are similar views illustrating alternative forms of lugs on the inner wall.
Figure 3C:
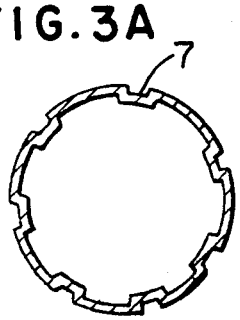
Figure 3D:
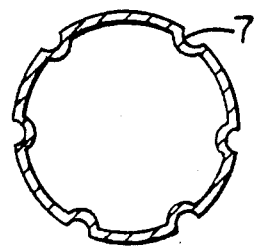

The hollow tubular core 2 of the invention is a cylindrical plastic tube having an internal diameter greater than the external diameter of the object to be covered, such as the cable joint illustrated in FIG. 1. The plastic tube has a plurality of circumferentially spaced, axially extending lugs on its inner wall. Two forms of lugs in the shape of rectangular and rounded ribs 6 are illustrated in FIGS. 3A and 3B, respectively. Two alternative forms of ribs formed by indentations in the wall of the core to form rectangular or rounded internal protrusions 7 are illustrated in FIGS. 3C and 3D, respectively. The wall of the hollow plastic core is preferably 0.5 to 2.5 mm thick with the lugs about 0.5 mm tall.

A continuous helical cut 5 is made in the wall of the tube from the exterior surface thereof to sever the tube into a continuous strip 2 with only the lugs 6 or 7 remaining connected axially along the length of the tube. The standard for the depth of the cut is preferably set as being a little deeper than the wall thickness of the hollow plastic core where there are no lugs (e.g. 0.1 to 0.2 mm deeper than the wall thickness). The lugs (which are preferably about 0.5 mm tall) will then not be cut even when the cut is deeper than the standard, and it has been found that the lugs still provide sufficient resistance to the shrinkage force of the elastic cover member 1 to retain the shape of the tubular structure. Furthermore, with the standard cut extending into the lugs, even when the cut is shallower than the standard, the wall of the portion where there are no lugs can be reliably cut completely in production so that the core can manually be broken into a continuous strip with ease.

One end of the strip 2 is broken away from the tube during manufacture and fed back through the tube to provide an exposed free end. In use, the free end can then be pulled on manually to break the strip 2 and remove it from the cover member 1, as illustrated in FIG. 1.

The core is preferably made of a versatile plastic, for example, either polypropylene, polyethylene or polyvinyl chloride may be used. The cylindrical tube is preferably extruded with a plurality of the lugs extending longitudinally on the inner wall. As illustrated in FIG. 3, the lugs may be rectangular or curved in cross-section and while they are preferably formed on a uniform thickness tubular wall as illustrated in FIGS. 3A and 3B, they may also take the form of longitudinal indentations in a uniform thickness wall as illustrated in FIGS. 3C and 3D. The continuous helical cut 5 made in the tube wall along its entire length may be made by a process similar to that of screw cutting.

I claim:

1. A hollow tubular plastic core for supporting an elastic tubular cover member in highly radially stretched condition so that the cover member can be positioned over a generally cylindrical object and the core removed to permit the cover member to contract to conform to the outer surface of the object, said hollow core comprising a cylindrical plastic tube with an internal diameter greater than the external diameter of the object to be covered and having a plurality of circumferentially spaced, axially extending lugs on the inner wall of said tube, a continuous helical cut in the wall of said tube from the exterior surface thereof severing said tube into a continuous narrow strip with only the lugs connected axially along the length of said tube, and one end of said strip being free from the tube for a distance and extending back through the tube.

* * * * *